(12) United States Patent
Yin et al.

(10) Patent No.: US 11,802,660 B2
(45) Date of Patent: Oct. 31, 2023

(54) SIMPLE GREASE FILLING MACHINE

(71) Applicant: Zhejiang Rongpen Air Tools Co., Ltd., Zhejiang (CN)

(72) Inventors: Zhenxing Yin, Zhejiang (CN); Junpeng Wei, Zhejiang (CN); Zhenhui Chen, Zhejiang (CN); Xiaorong Li, Zhejiang (CN); Fazheng Yang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 0 days.

(21) Appl. No.: 17/870,874

(22) Filed: Jul. 22, 2022

(65) Prior Publication Data
US 2023/0258297 A1    Aug. 17, 2023

(30) Foreign Application Priority Data
Feb. 12, 2022  (CN) .......................... 2022210130740.1

(51) Int. Cl.
*F16N 11/08*      (2006.01)

(52) U.S. Cl.
CPC ................................... *F16N 11/08* (2013.01)

(58) Field of Classification Search
CPC ........... F16N 11/08; F16N 13/16; B67D 7/02; B67D 7/645; B05C 11/1002
See application file for complete search history.

(56) References Cited

U.S. PATENT DOCUMENTS

| | | | | |
|---|---|---|---|---|
| 2,997,215 | A * | 8/1961 | Chinchole | F16N 13/16 222/261 |
| 4,444,547 | A * | 4/1984 | Stolz | F16N 13/16 91/352 |
| 10,486,958 | B1 * | 11/2019 | Hryckowian | B05C 11/1002 |
| 11,518,672 | B2 * | 12/2022 | Tasaka | B67D 7/645 |
| 2007/0289994 | A1 * | 12/2007 | Kotyk | B67D 7/16 222/386 |
| 2013/0256062 | A1 * | 10/2013 | Kotyk | F16K 21/18 184/36 |
| 2019/0322521 | A1 * | 10/2019 | Enderle | B67D 7/645 |

* cited by examiner

*Primary Examiner* — Michael R Mansen
*Assistant Examiner* — Mark K Buse (57) ABSTRACT

An easy grease filling machine is disclosed. The grease filling machine comprises a drum cover, a pump body that goes through the drum cover, a grease pressing disc fitted on the pump body. The periphery of the drum cover is configured with a quick locking mechanism compatible to the rim of the grease packing drum and fixed with the drum body, and is matched by a grease pressing disc with its size automatically changeable when it moves up or down inside the drum body based on the different diameters of the drum body from bottom to top. The grease pressing disc comprises a disc body and a grease scraping skirt configured on the outer periphery of the disc body with its cross section shaped like an inverted V.

6 Claims, 8 Drawing Sheets

SIMPLE GREASE FILLING MACHINE

BACKGROUND OF INVENTION

1. Field of the Invention

The present invention relates generally to a grease filling machine, and more particularly to an easy grease filling machine.

2. Description of Related Art

A grease filling machine (or grease filler) is a machine to increase the pressure when filling grease into a lubrication opening.

A standard grease filling machine comprises a cylinder, a pressure meter and a pump head made up of several connecting plugs, a greasing gun connected to the connecting plugs, a pump body sunk deep into the grease drum, a drum cover fixed on the rim of the grease drum with the pump body going through it, and a grease pressing disc fitted on the pump body to apply pressure on the grease inside the grease drum.

In operation, the grease must firstly be dug out from the packing drum and filled into the grease drum. Then, through the pump body, the pump head cylinder applies pressure upon the grease sealed by the grease pressing disc. Then, the grease can be squeezed out through the greasing gun.

During operation of the prior-art grease filling machines, the grease pressing disc and pump body cannot be inserted directly into the grease packing drum and apply pressure to squeeze out the grease. There are two reasons:

First, the drum cover cannot be directly fixed on the grease packing drum;

Second, the size of the grease packing drum is not standardized, and usually the drum body is big on the top and small on the bottom. The grease pressing discs available on the current market are unable to thoroughly clean the grease on the wall of the grease packing drum. When the grease pressing disc is small, spill-over will happen on the top part of the drum, and when the grease pressing disc is too big, the grease pressing disc will be stuck in the middle, and the grease pressing disc has to be replaced during the operation (this is particularly the case when it comes to an electric grease filling machine). This is unavoidable unless the drum body of the grease packing drum is uniform-sized from top to bottom.

SUMMARY OF THE INVENTION

The purpose of the present invention is to solve the technical problem that the existing grease machine cannot be directly installed on the grease packaging barrel to pressurize and extract the grease, and provides a grease machine that can be directly installed on the grease packaging barrel.

The technical scheme of the problem to be solved by the present invention is as follows:

A simple grease filling machine, comprising a drum cover, a pump body running through the drum cover, and a grease pressing disc sleeved on the pump body, wherein the periphery of the drum cover is configured with a quick locking mechanism compatible to the rim of the grease packing drum and fixed with the drum body, and is matched by a grease pressing disc with its size automatically changeable when it moves up or down inside the drum body based on the different diameters of the drum body from bottom to top; the grease pressing disc includes a disc body and a grease scraping skirt configured on an outer periphery of the disc body with its cross section shaped like an inverted V, the grease scraping skirt includes a framework connected on the outer periphery of the disc body with its cross section in the shape of an inverted V, and a macromolecular material layer covering the surface of the framework, the disc body is configured with an air releasing port, an air plug is plugged in the air releasing port, the other end of the air plug is connected to an air releasing pull ring via a pull cord that goes through the drum cover.

More particularly, wherein the quick locking mechanism includes a locking plate and a locking buckle, the upper end of the locking buckle is hinged on the locking plate, the locking plate is hinged on the rotation frame on the rim of the drum cover through a rotation shaft; there are at least two quick locking mechanisms, and both of them are configured on the outer periphery of the drum cover.

More particularly, wherein both sides of the locking plate are configured with a plurality of hinge holes distributed from top to bottom at intervals, a straight slot connects the hinge holes laterally, the upper end of the locking buckle is configured with a clasping arm, the clasping arm can slide along the straight slot and can be locked into the corresponding hinge hole so that it is hinged on the locking plate, thus adjusting the lower end of the locking buckle to move up or down in the vertical direction.

More particularly, wherein the outermost side of the grease scraping skirt is configured with at least one grease scraping slope, the grease scraping slope is formed by extending from the surface of the macromolecular material layer on the outer side of the skirt toward the outside.

More particularly, wherein the framework is formed by a plurality of framework units with the center of the disc body as their rotation axis and their projections on the horizontal plane are in the shape of hollow squares circularly distributed like a fan.

More particularly, wherein the framework is fixed with the disc body via evenly distributed rivets.

The advantages and benefits of the invention are as follow:

Through a quick locking mechanism, the present invention enables the pump body to match and be fixed on the grease packing drum. Through the inverted-V-shaped grease scraping skirt structure on the outer periphery of the grease pressing disc, the grease can be cleaned thoroughly when the grease packing drum has varying diameters from top to bottom. The grease filling machine can be installed directly on the grease packing drum, while thoroughly clean the grease on the wall of the grease drum with varying diameters from top to bottom. Moreover, through the air releasing port, the invention solves the problem that the grease pressing disc cannot be pulled out when the grease is used up.

DETAILED DESCRIPTION OF THE INVENTION

As disclosed in FIG. 1 to FIG. 8, the easy grease filling machine comprises a drum cover 1, a pump body 2 that goes through the drum cover 1, a grease pressing disc 3 fitted on the pump body 2, a cylinder 4 on top of the pump body 2 exposed above the drum cover 1, a pressure meter 5 and some connecting plugs 6. A grease pressing plate spring 7 is sheathed on the pump body 2 between the drum cover 1 and grease pressing plate 3. Moreover, the drum cover 1 is provided with a handle 8.

Figure 1:
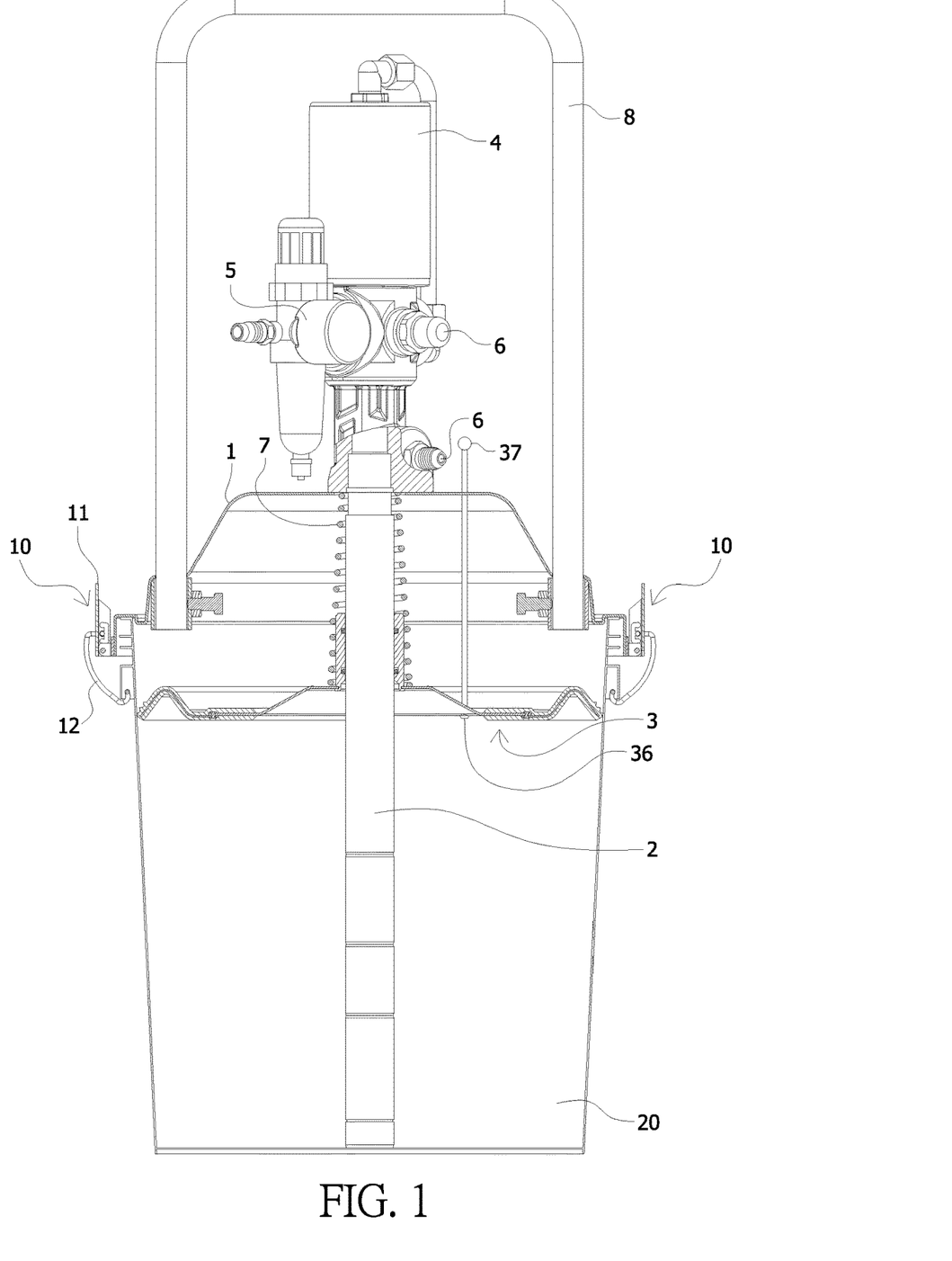
FIG. 1 is a sectioned structural view of the invention installed on a grease packing drum.

The periphery of the drum cover 1 is configured with a quick locking mechanism 10 compatible to the rim of the grease packing drum and fixed with the drum body 20, and is matched by a grease pressing disc 3, the size of which can be automatically adjusted when the pump body 2 moves up and down according to the different diameters of the drum body 20 from top to bottom.

Figure 4:
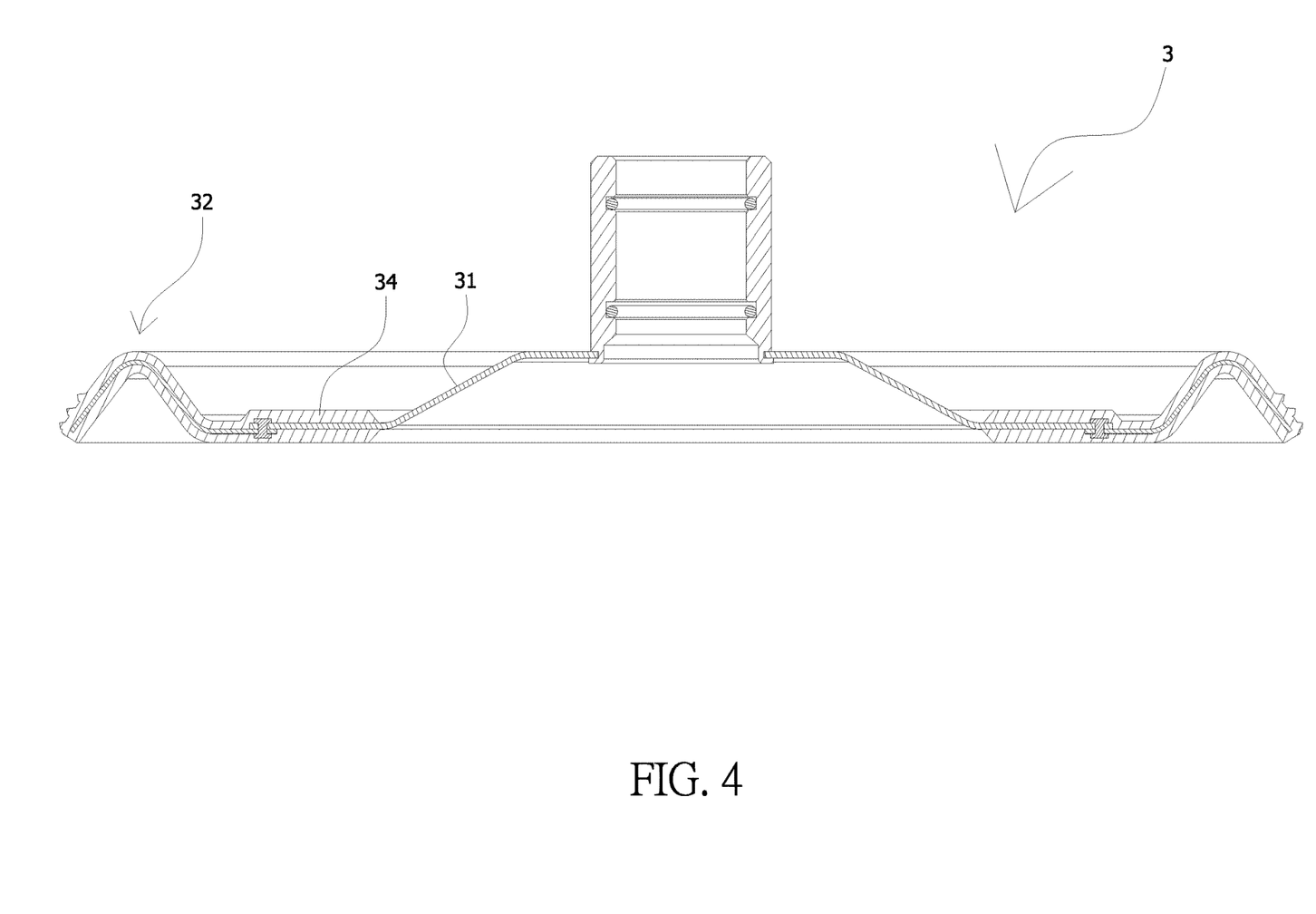
FIG. 4 is a sectional view of the grease pressing disc disclosed in the invention.
Figure 5:
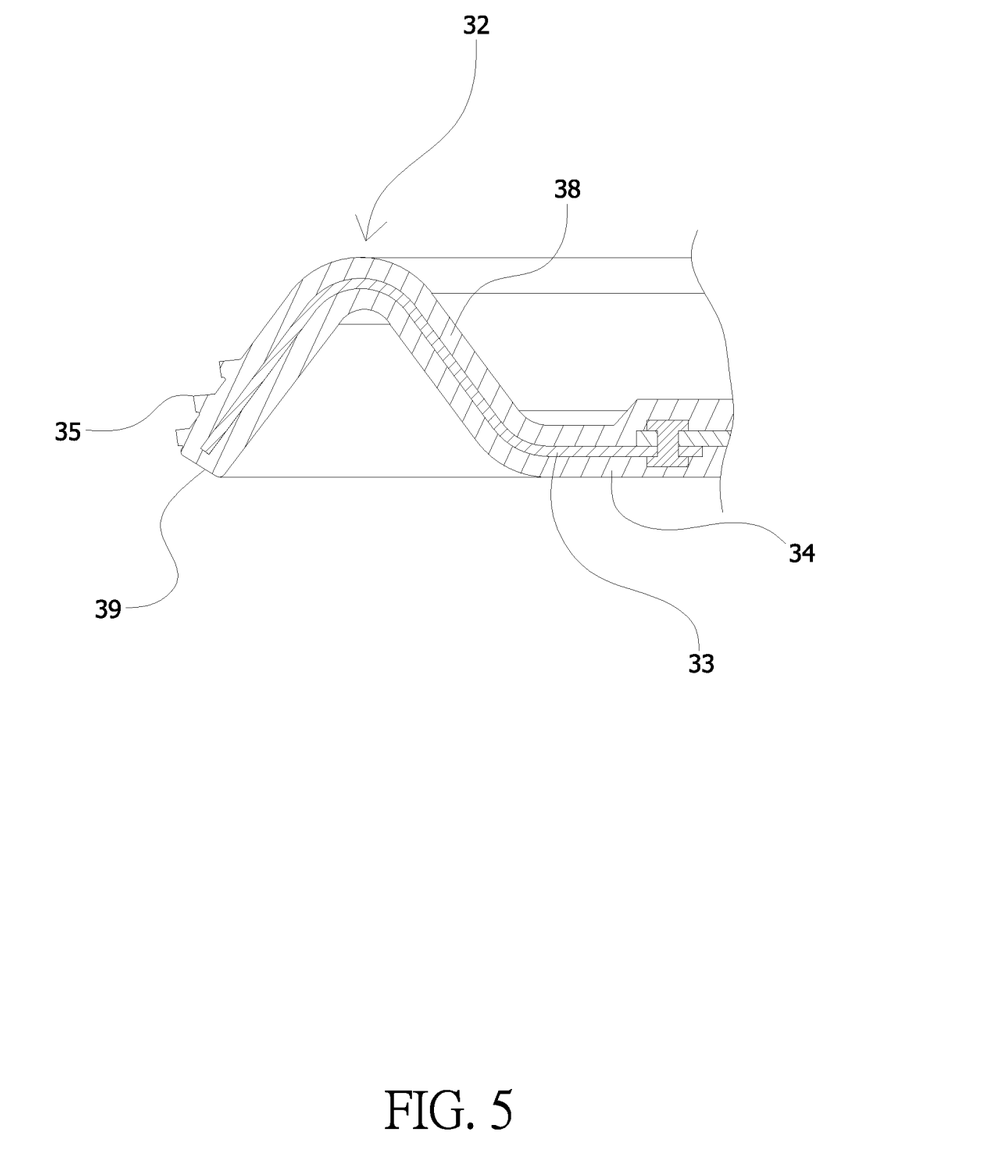
FIG. 5 is an enlarged view of the grease scraping skirt of the grease pressing disc according to the invention.
Figure 6:
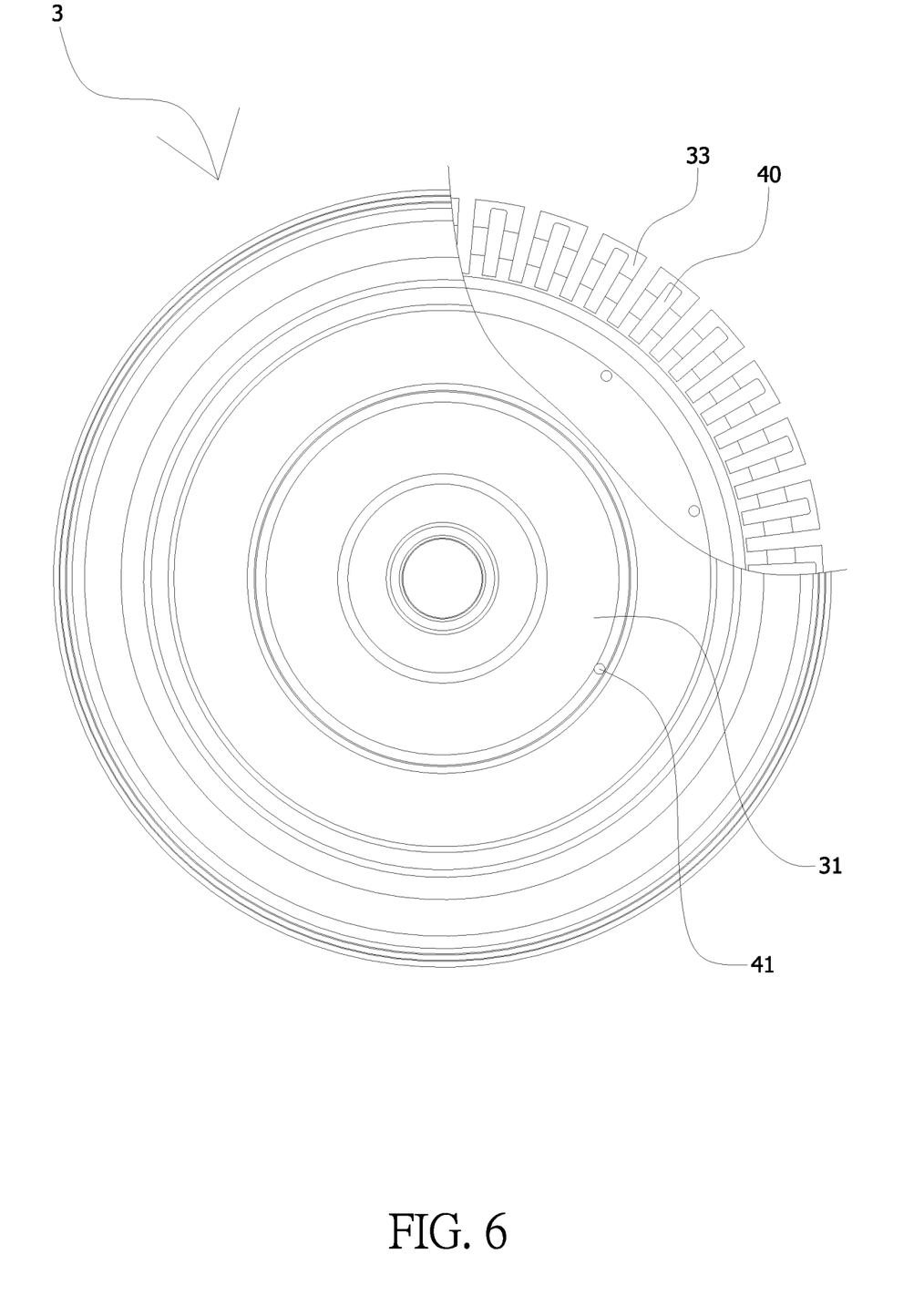
FIG. 6 is a top view of the grease pressing disc of the invention with part of the structure in a sectioned view.

Referring to FIG. 4 to FIG. 6, the grease pressing disc 3 comprises a disc body 31 and a grease scraping skirt 32 configured on the outer periphery of the disc body 31 with an inverted-V-shaped cross section; the grease scraping skirt 32 comprises a framework 33 connected on the outer periphery of the disc body 31 with an inverted-V-shaped cross section, and a macromolecular material layer 34 covering the surface of the framework 33; the disc body 31 is configured with an air releasing port 41. An air plug 36 is plugged in the air releasing port 41. The other end of the air plug 36 is connected to an air releasing pull ring 37 through a pull cord that goes through the drum cover 1, as disclosed in FIG. 1.

In implementation, the material used for the macromolecular material layer 34 is rubber, which can offer soft sealing and friction resistance. The framework 33 is fixed on the disc body 31 of the grease pressing disc 3 via several riveting points.

Users open the drum cover 1 of the grease packing drum, then face the grease pressing disc 3 of the grease filling machine toward the surface of the grease in a tilted position and press down. When one side of the grease pressing disc 3 touches the grease, move the pump body 2 to a vertical position. After the grease pressing disc 3 is completely pressed on the surface of the grease, align and fit the drum cover 1 of the grease filling machine to the outer edge of the grease packing drum through the quick locking mechanism 10. Now the grease pressing disc spring 7 is tightly pressing upon the upper surface of the grease pressing disc 3, and the easy installation of the grease filling machine is completed.

Figure 7:
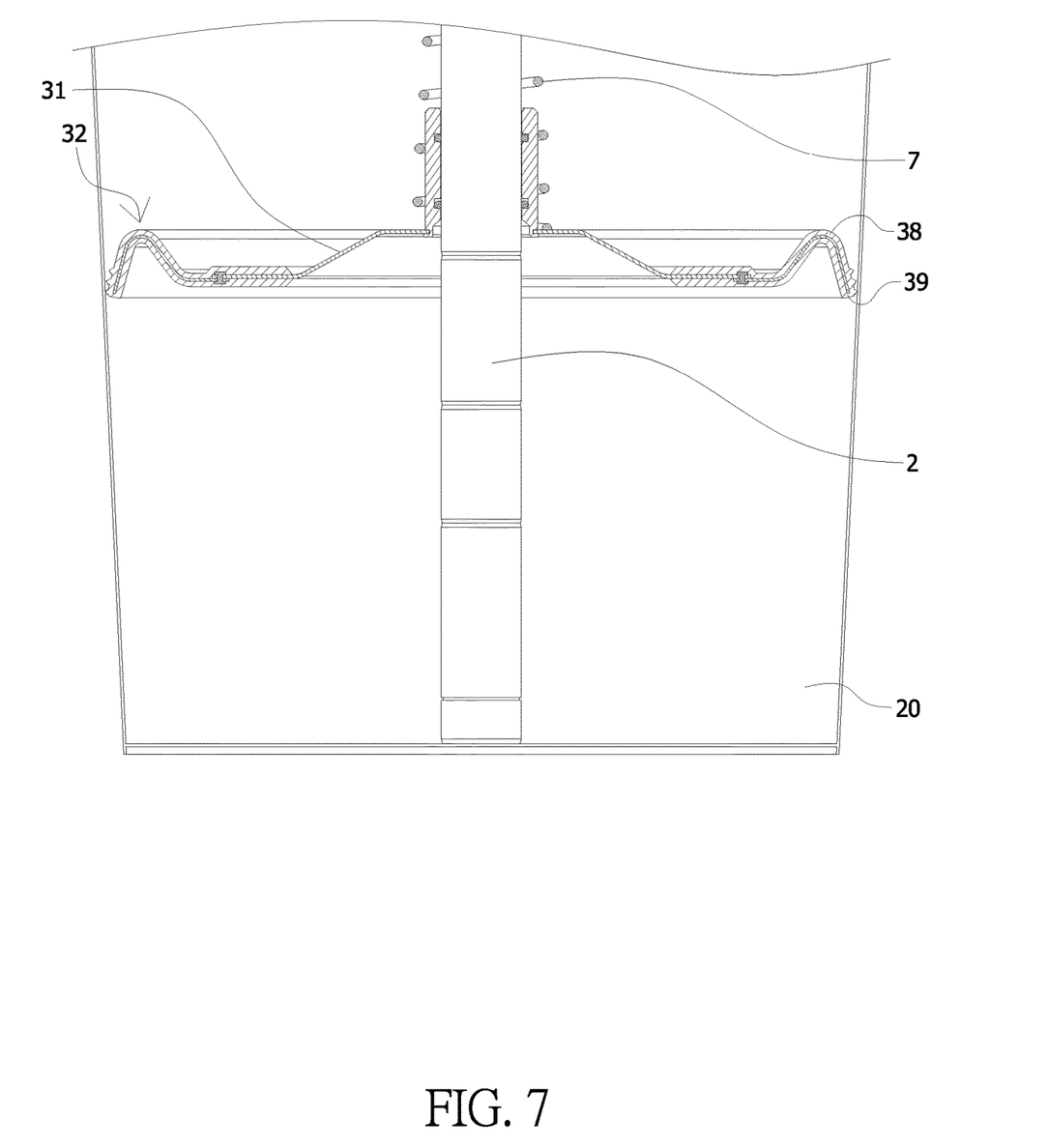
FIG. 7 is a state view of the grease pressing disc positioned on the top of the drum body.
Figure 8:
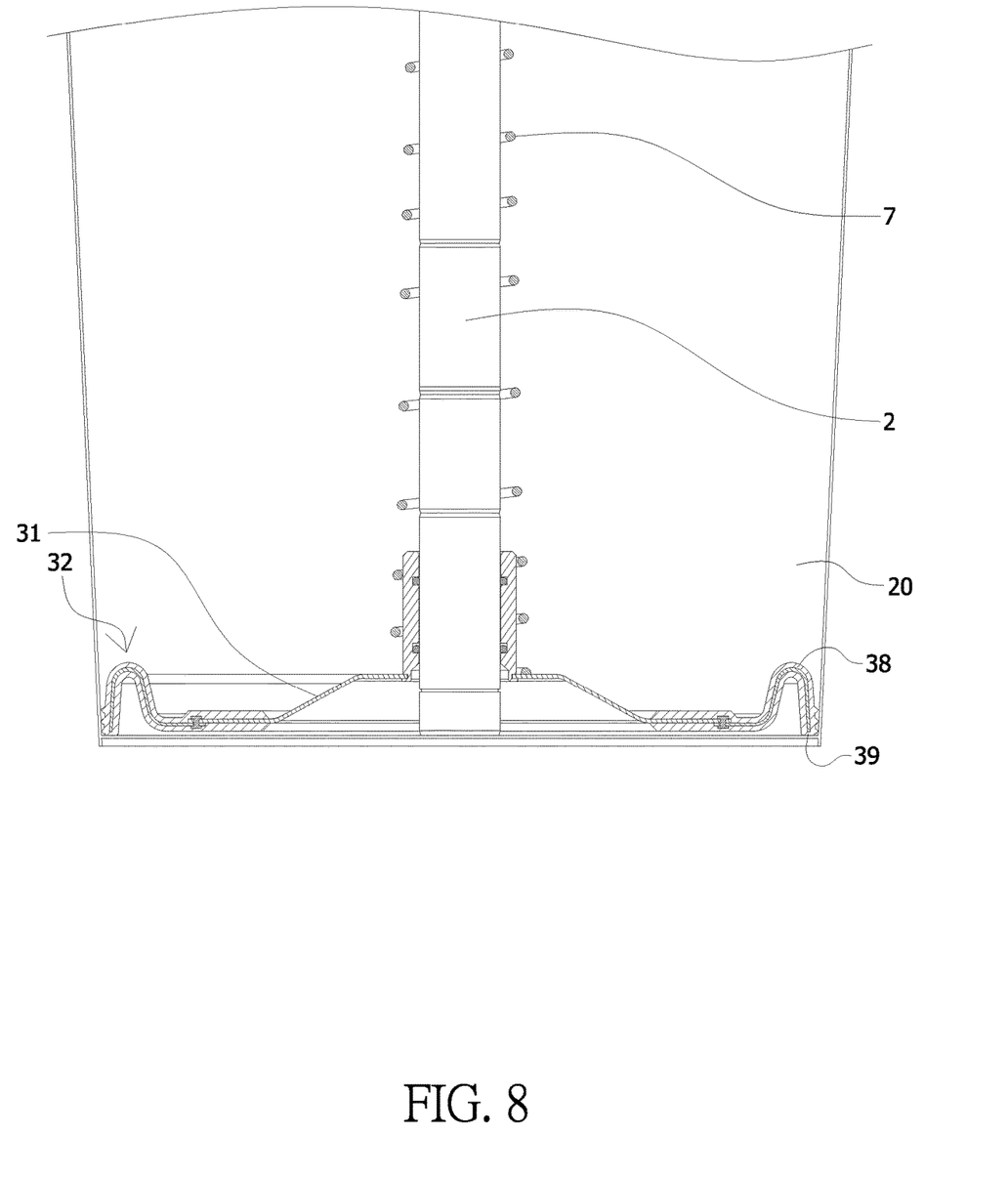
FIG. 8 is a state view of the grease pressing disc positioned on the bottom of the drum body.

Referring to FIG. 7 and FIG. 8, the subsequent operation is similar to the prior-art grease filling machine. When the grease is pressed and pumped, the level of the grease inside the grease packing drum will be lowered gradually. During this process, the inverted-V-shaped tip end 39 of the grease scraping skirt 32 having an inverted-V-shaped cross section on the outer periphery of the disc body 31 of the grease pressing disc 3 will be squeezed by the wall of the drum while moving from the top of the packing drum with a larger diameter to the bottom with a smaller diameter. The V-shaped portion 38 is bent, and the diameter of the whole disc surface of the grease pressing disc 3 is reduced to touch the drum wall tightly. Thus, the grease on the drum wall can be cleaned thoroughly.

During the process, when the grease pressing disc 3 moves close to the bottom of the drum, the spring force of the grease pressing disc spring 7 is gradually reduced. However, due to the compression of the inverted-V-shaped tip end, the inverted-V-shaped grease scraping skirt of the grease pressing disc will supplement the internal pressure of the lower part of the grease pressing disc upon the grease, till the grease pressing disc 3 reaches the bottom of the drum. The internal pressure below the grease pressing disc 3 will become negative pressure to suck the grease pressing disc 3. Now, pull the air plug 36 via the air releasing pull ring 37 on the drum cover 1, so that the space below the air releasing port 41 sealed by the air plug 36 is communicated to the space above the grease pressing disc 3, and the air pressure under the grease pressing disc 3 is recovered. Thus, the grease pressing disc 3 can be pulled out and separated from the bottom of the drum.

Figure 2:
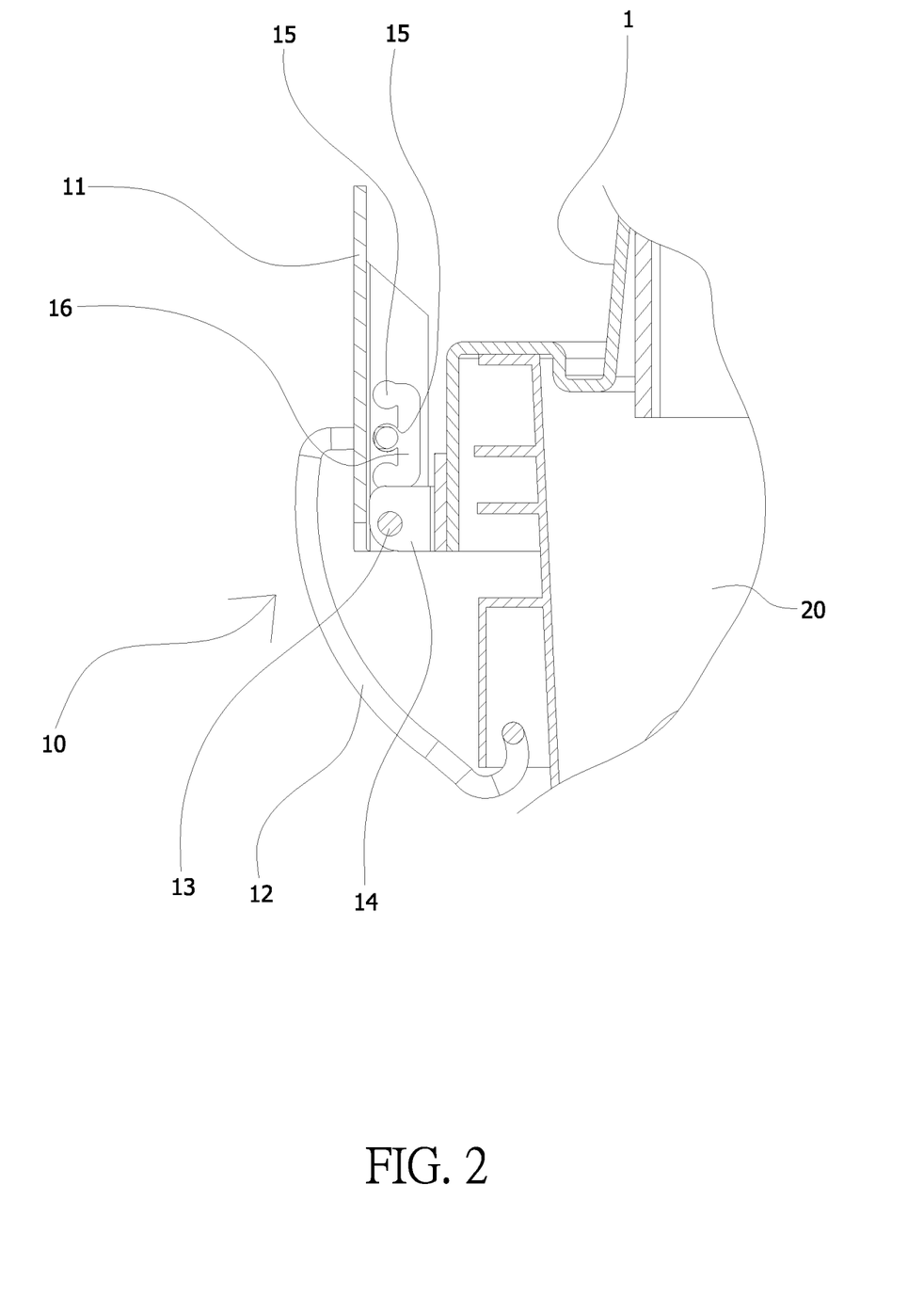
FIG. 2 is an enlarged view of the quick locking mechanism of the invention.
Figure 3:
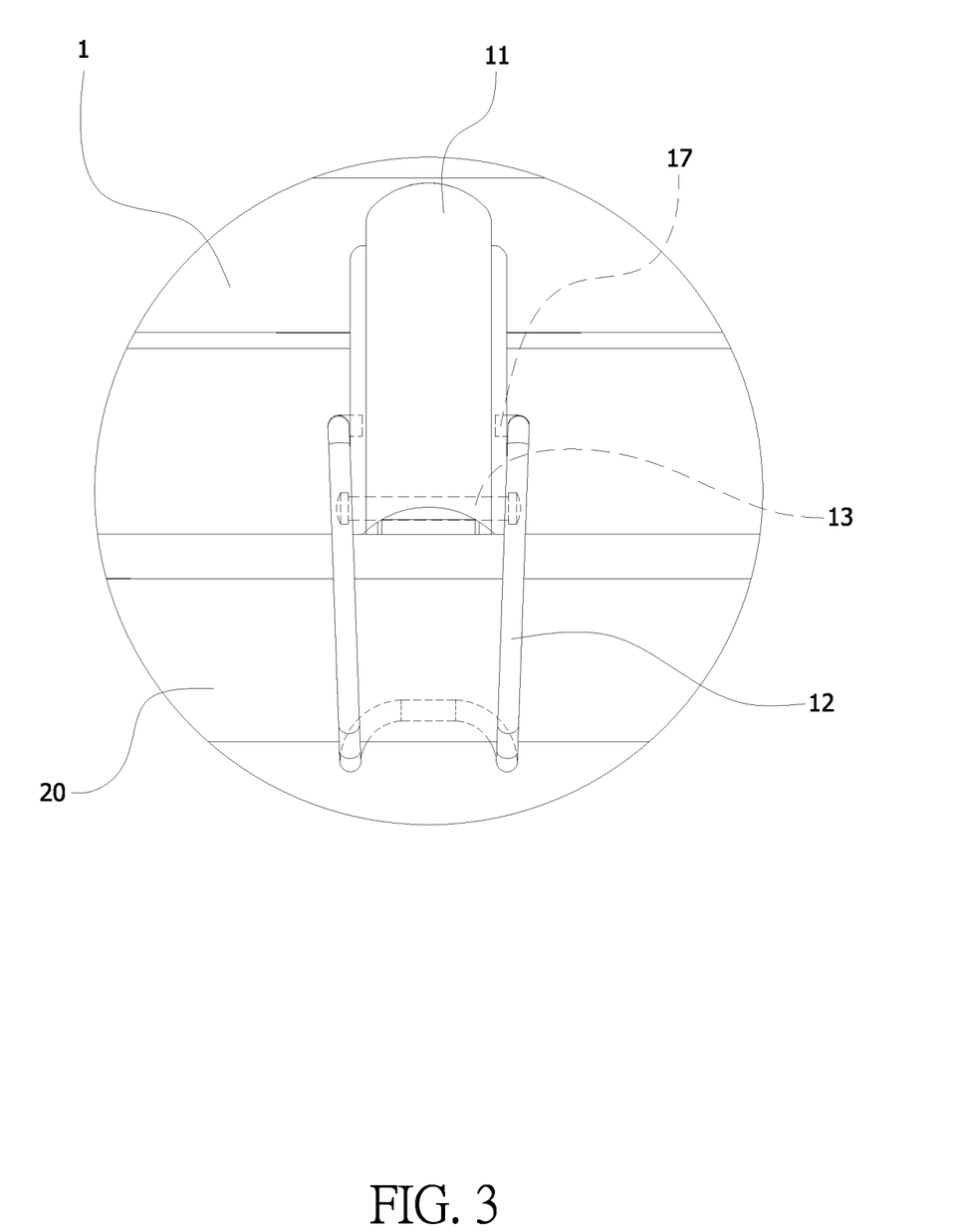
FIG. 3 is an assembly view of the locking plate and the locking buckle in the quick locking mechanism.

Referring to FIG. 2 and FIG. 3, the quick locking mechanism 10 comprises a locking plate 11 and a locking buckle 12; the upper end of the locking buckle 12 is hinged on the locking plate 11, the locking plate 11 is hinged on the rotation frame 14 on the rim of the drum cover 1 via a rotation shaft 13; there are at least two quick locking mechanisms 10, both configured on the edge of the outer periphery of the drum cover 1.

It is to be noted that, the grease packing drum is a grease packing drum commonly seen in the current market. The surface of the outer side of the rim of the packing drum has an edge that extends outward and then downward. The locking buckle 12 in the present invention is buckled on the inner side of the extending edge. If there is no extending edge on the outer side of the packing drum, it is not an object in connection with the technical problem to be solved by the present invention.

In implementation, the locking plate 11 is firstly removed from the rotation frame 14 through rotation. Then the end part of the locking buckle 12 is pressed on a position below the extending edge on the outer side of the rim of the grease packing drum and tilted inward. Then, rotate the locking plate 11 upward to complete the locking of the quick locking mechanism 10.

Referring to FIG. 2 and FIG. 3, both sides of the locking plate 11 is configured with a plurality of hinge holes 15 distributed from top to bottom at intervals, a straight slot 16 laterally goes through all the hinge holes 15. The upper end of the locking buckle 12 is configured with a clasping arm 17. The clasping arm 17 slides along the straight slot 16 and can be caught inside the corresponding hinge hole 15 and be hinged on the locking plate 11, thus adjusting the lower end of the locking buckle 12 to move up or down in the vertical direction.

In implementation, the locking plate 11 can be firstly removed from the rotation frame 14 through rotation. If the extending edge of the packing drum is far below the rim of the drum, the clasping arm 17 can be adjusted to slide along the straight slot 16 till the lowest hinge hole 15. Then, pull the adjusting clasping arm 17 into the hinge hole 15 from the straight slot 16 on the edge of the hinge hole 15. Then, press the end part of the locking buckle 12 on the position below the extending edge and tilt inward. At last, rotate the locking plate 11 upward to complete the tight locking of the quick locking mechanism L.

In case the extending edge is close to the rim of the packing drum, select the upside hinge hole along the straight slot 16.

Referring to FIG. 5, the outermost side of the grease scraping skirt 32 is configured with at least one grease scraping slope 35. The grease scraping slope 35 is formed by extending from the surface of the macromolecular material layer on the outer side of the skirt toward the outside. In the present embodiment, there are preferably three grease scraping slopes 35.

In implementation, the cross section of the grease scraping slope 35 is a triangle, and its top part is protruded outward. When the grease pressing disc 3 is pressed down, the inverted-V-shaped end part is compressed and squeezed by the tilted drum wall, and the triangular grease scraping slope 35 can slide along and scrape the drum wall.

When the grease pressing disc 3 is pressed further down, the inverted-V-shaped end part is further compressed, the second and third grease scraping slopes 35 form a plurality of grease scraping surfaces to scrape the drum wall once and once again to thoroughly clean the drum wall.

Referring to FIG. 6, the framework 33 is formed by a plurality of framework units 40 with the center of the disc body 31 as their rotation shaft, and their projections on the horizontal plane are in the shape of hollow squares or bars, circularly distributed like a fan.

In implementation, the shape of the framework units 40 of the framework 33 with their projections on the horizontal plane in the shape of hollow squares or bars can increase the deformation space of the elastic compression of the framework 33 when squeezed, provide more uniform support to the drum wall, and form a plurality of deformation areas.

In addition, the shape of the framework units 40 matches the grease scraping skirt 32 having its cross section in the shape of an inverted V, forming a wave-like shape in the space to receive squeeze from the peripheral direction and be compressed.

Moreover, the framework 33 is fixed with the disc body via evenly distributed rivets. In implementation, when the framework 33 is fixed via the rivets, an extra compression and deformation position can be added, so that the grease scraping skirt 32 can be compressed and deformed further more.

At last, the skirt in the shape of an inverted V can be configured to be in the shape of W formed by two Vs, or even in a shape formed by three or more than three Vs. All equivalent substitutes fall within the scope of the invention.

We claim:
1. A simple grease filling machine, comprising
a drum cover, a pump body running through the drum cover, and a grease pressing disc sleeved on the pump body, wherein the periphery of the drum cover is configured with a quick locking mechanism compatible to the rim of the grease packing drum and fixed with the drum body, and is matched by a grease pressing disc with its size automatically changeable when it moves up or down inside the drum body based on the different diameters of the drum body from bottom to top;
the grease pressing disc includes a disc body and a grease scraping skirt configured on an outer periphery of the disc body with its cross section shaped like an inverted V, the grease scraping skirt includes a framework connected on the outer periphery of the disc body with its cross section in the shape of an inverted V, and a macromolecular material layer covering the surface of the framework, the disc body is configured with an air releasing port, an air plug is plugged in the air releasing port, the other end of the air plug is connected to an air releasing pull ring via a pull cord that goes through the drum cover.

2. The simple grease filling machine defined in claim 1, wherein the quick locking mechanism includes a locking plate and a locking buckle, the upper end of the locking buckle is hinged on the locking plate, the locking plate is hinged on the rotation frame on the rim of the drum cover through a rotation shaft; there are at least two quick locking mechanisms, and both of them are configured on the outer periphery of the drum cover.

3. The simple grease filling machine defined in claim 2, wherein both sides of the locking plate are configured with a plurality of hinge holes distributed from top to bottom at intervals, a straight slot connects the hinge holes laterally, the upper end of the locking buckle is configured with a clasping arm, the clasping arm can slide along the straight slot and can be locked into the corresponding hinge hole so that it is hinged on the locking plate, thus adjusting the lower end of the locking buckle to move up or down in the vertical direction.

4. The simple grease filling machine defined in claim 1, wherein the outermost side of the grease scraping skirt is configured with at least one grease scraping slope, the grease scraping slope is formed by extending from the surface of the macromolecular material layer on the outer side of the skirt toward the outside.

5. The simple grease filling machine defined in claim 1, wherein the framework is formed by a plurality of framework units with the center of the disc body as their rotation axis and their projections on the horizontal plane are in the shape of hollow squares circularly distributed like a fan.

6. The simple grease filling machine defined in claim 1, wherein the framework is fixed with the disc body via evenly distributed rivets.

* * * * *